US006435687B1

(12) United States Patent
Fukiharu

(10) Patent No.: US 6,435,687 B1
(45) Date of Patent: *Aug. 20, 2002

(54) REFLECTION ILLUMINATION DEVICE FOR OBJECT TO BE ILLUMINATED

(75) Inventor: Eiichi Fukiharu, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/516,138

(22) Filed: Mar. 1, 2000

(30) Foreign Application Priority Data

Mar. 3, 1999 (JP) .......................................... 11-055802

(51) Int. Cl.[7] ................................................ F21V 8/00
(52) U.S. Cl. .............................. 362/31; 362/26; 349/65
(58) Field of Search ........................... 362/31, 27, 561, 362/26, 330, 339; 349/67, 62, 63–65; 359/49

(56) References Cited

U.S. PATENT DOCUMENTS 5,641,219 A * 6/1997 Mizobe ........................ 362/31
5,719,649 A * 2/1998 Shono et al. .................. 362/31
5,844,720 A * 12/1998 Ohara et al. .................. 362/31
6,048,071 A * 4/2000 Sawayama .................... 362/31

FOREIGN PATENT DOCUMENTS

JP          8-227015        * 9/1996

* cited by examiner

Primary Examiner—Sandra O'Shea
Assistant Examiner—Bao Truong
(74) Attorney, Agent, or Firm—Scully, Scott, Murphy & Presser

(57) ABSTRACT

A reflection illumination device includes a light guide, light sources, and a reflecting mirror. The light guide is placed in front of an object to be illuminated. The light sources are arranged around the light guide. The reflecting mirror is placed behind the object. One or a plurality of total reflection areas on which projections or recesses each having a triangular cross-section and serving to totally reflect light emitted from the light source toward the object are formed are arranged on the surface of the light guide. Each of the projections or recesses is constituted by an inclined surface inclined at a predetermined angle toward a reference portion positioned at a predetermined position on the light guide, and a vertical surface vertical to the light guide. The light sources and irradiation means for parallelly irradiating the total reflection areas with light from the light sources are arranged at edges of the light guide in correspondence with the total reflection areas.

6 Claims, 3 Drawing Sheets

PRIOR ART

REFLECTION ILLUMINATION DEVICE FOR OBJECT TO BE ILLUMINATED

BACKGROUND OF THE INVENTION

The present invention relates to a reflection illumination device for an object to be illuminated, which is placed in front of the object to display the object with reflected light, and improves display quality by preventing diffused reflection of external light.

As an illumination device for illuminating an object such as a liquid crystal display apparatus, a device having the following arrangement is known. In this illumination device, a light guide is placed in front of the object, a light source such as an LED is placed at a side surface of the light guide, and a reflecting mirror is placed behind the object. In this arrangement, illumination light from the light source which is totally reflected by the surface of the light guide is reflected by the reflecting mirror to display the object on the surface of the light guide.

FIG. 5 shows a known liquid crystal display apparatus using such a reflection illumination device. Referring to FIG. 5, reference numeral 2 denotes a light guide; 10, a liquid crystal display apparatus as an object; 6, a light source, and 9, a reflector plate.

The illumination device in FIG. 5 will be described. First of all, illumination light S emitted from a light source 6 travels in the light guide 2 while repeatedly undergoing total reflection at flat portions on the upper- and lower-surface sides of the light guide 2. The illumination light S incident on an inclined surface 4 of each projection 3 formed on the surface of the light guide 2 changes its direction to a direction perpendicular to the light guide 2 (the vertical direction of the drawing surface of FIG. 5), passes through the light guide 2, and reaches the reflector plate 9 through the liquid crystal display apparatus 10. The illumination light S is reflected by the reflector plate 9, passes through the liquid crystal display apparatus 10 and light guide 2, and emerges outside from the surface of the light guide 2. With the above operation, the contents displayed on the liquid crystal display apparatus 10 are projected on the surface of the light guide 2.

Such a reflection illumination device can illuminate an object by using external light such as sunlight or light from an indoor lamp, and hence has advantages, e.g., low power consumption and allowing a reduction in equipment size.

However, the following problems are posed in the above conventional reflection illumination device.

The problems will be described with reference to FIG. 6. The first problem is that unnecessary reflected light makes it difficult to see part of the contents displayed on the liquid crystal display apparatus. An external light beam $R_1$ incident on a flat portion of the surface of the light guide 2 passes through the light guide 2 and liquid crystal display apparatus 10, without changing its optical path, and is reflected by the reflector plate 9. As a consequence, the contents displayed on the liquid crystal display apparatus 10 are displayed on the surface of the light guide 2. On the other hand, an external light beam $R_2$ incident on the inclined surface 4 of the projection 3 reaches the opposing inclined surface 4 upon changing its traveling direction, and is reflected by the inclined surface 4 to enter an eye of a user in front of the light guide 2 upon further changing its direction. According to the prior art, therefore, unnecessary reflected light of the external light beam $R_2$ makes it difficult to see part of the contents displayed on the liquid crystal display apparatus 10.

The second problem is that the contents displayed on the liquid crystal display apparatus illuminated with light vary in brightness depending on the display positions, resulting in luminance irregularity. The illumination light S emitted from the light source 6 travels in the light guide 2 while being repeatedly reflected. For this reason, as the distance from the light source 6 increases, the brightness of the illumination light S decreases, resulting in luminance irregularity, i.e., different luminances at different portions of the light guide 2. As a consequence, the contents displayed on the liquid crystal display apparatus 10 illuminated with light vary in brightness depending on display positions, resulting in luminance irregularity.

SUMMARY OF THE INVENTION

It is, therefore, a principal object of the present invention to provide a reflection illumination device for an object to be illuminated, which can obtain high-quality display by preventing external light reflected by the surface of a light guide from entering the eyes of a user, and a reflection illumination device for an object to be illuminated, which can obtain high-quality display that is bright throughout the display and free from luminance irregularity.

In order to achieve the above object, according to the present invention, there is provided a reflection illumination device comprising a light guide placed in front of an object to be illuminated, a light source arranged around the light guide, and a reflecting mirror placed behind the object, wherein one or a plurality of total reflection areas on which projections or recesses each having a triangular cross-section and serving to totally reflect light emitted from the light source toward the object are formed and arranged on a surface of the light guide, each of the projections or recesses is constituted by an inclined surface inclined at a predetermined angle toward a reference portion positioned at a predetermined position on the light guide, and a vertical surface vertical to the light guide, and the light source or irradiation means for parallelly irradiating the total reflection area with light from the light sources are arranged at an edge of the light guide in correspondence with the total reflection area.

DESCRIPTION OF THE PREFERRED EMBODIMENTS

Embodiments of the present invention will be described in detail below with reference to the accompanying drawings. Although an object to be illuminated in each of the following embodiments will be described as a liquid crystal display apparatus used for a personal computer, portable telephone, or the like, the present invention can be applied to any kind of equipment for which a reflection illumination device can be used.

Figure 1:
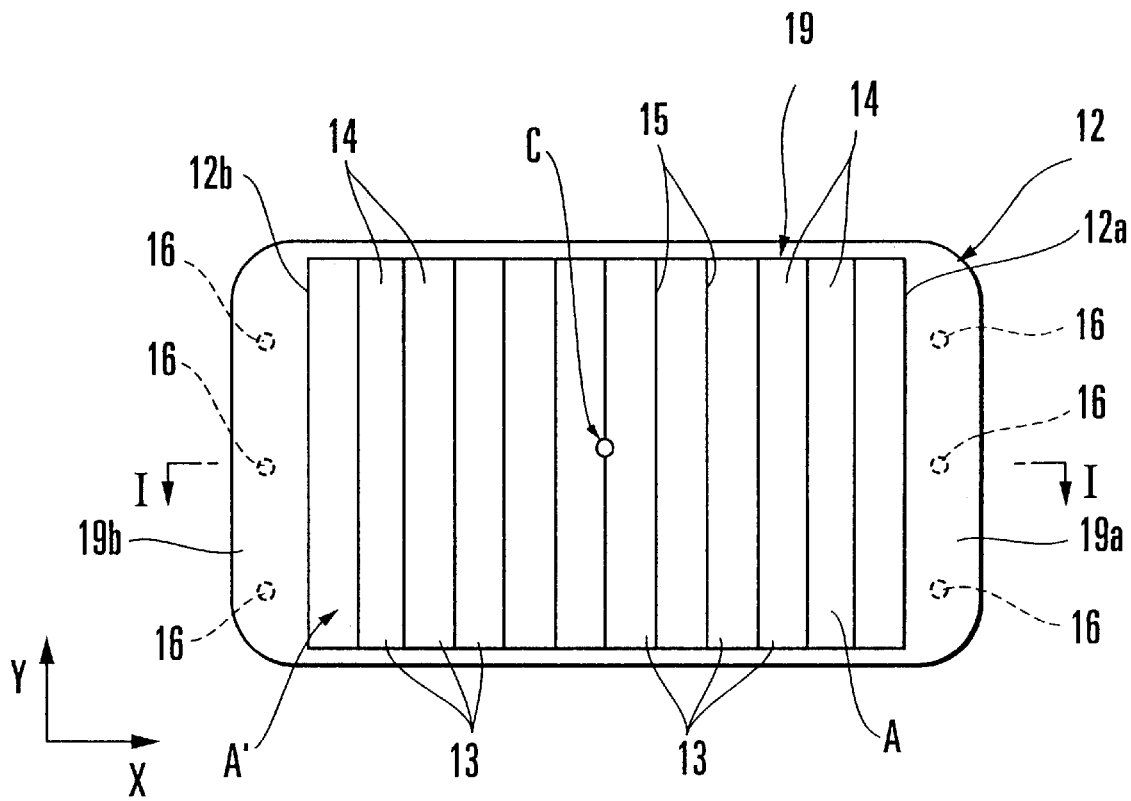
FIG. 1 is a plan view of a reflection illumination device according to an embodiment of the present invention.
Figure 2:
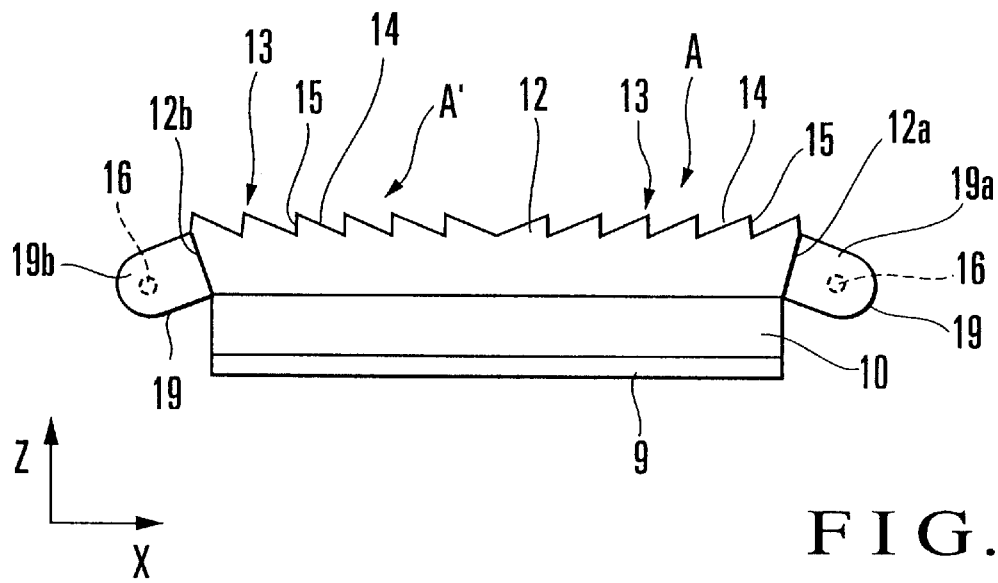
FIG. 2 is a sectional view taken along a line I—I in FIG. 1.
Figure 3:
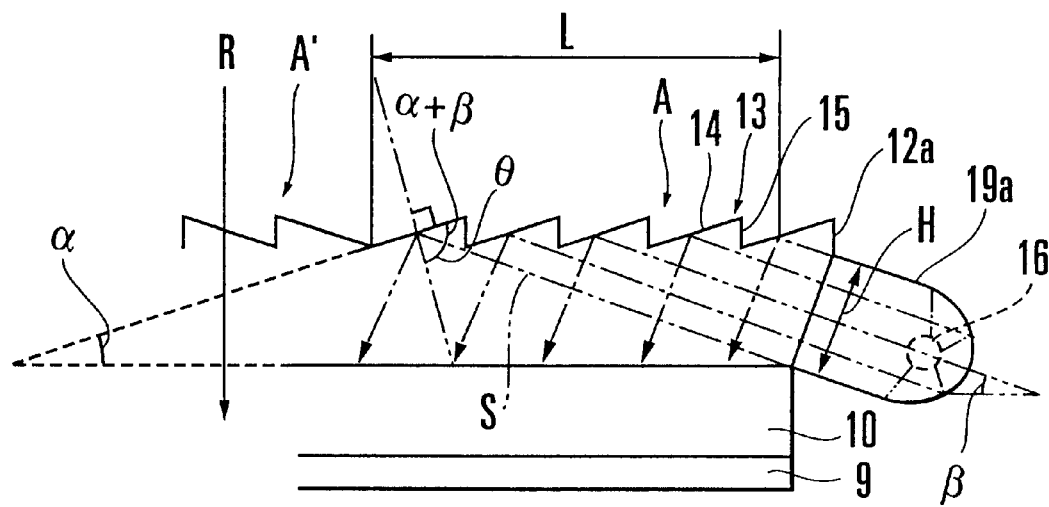
FIG. 3 is a partial enlarged view of FIG. 2, which is used to explain the relationship between the inclination of an inclined surface and the irradiation direction angle of illumination light.

FIGS. 1 and 2 show a reflection illumination device according to an embodiment of the present invention. FIG. 3 is a view for explaining the relationship between the inclination of an inclined surface and the irradiation direction angle of illumination light.

Two total reflection areas A and A' are formed on the surface of a light guide 12 in the reflection illumination device of this embodiment. The total reflection areas A and A' totally reflect illumination light from light sources 16. The total reflection areas A and A' are symmetrically arranged on the left and right sides (the left and right sides of FIG. 1) of the Y-axis passing through a center C.

A plurality of projections 13 are symmetrically formed in the total reflection areas A and A' to be arrayed from the Y-axis to right and left edges 12a and 12b of the light guide 12. The projections 13 are formed parallel to the Y-axis at the same pitch. Each projection 13 has a triangular cross-section. Each projection 13 is low enough. to avoid visual impairment of the contents displayed on a liquid crystal display apparatus 10. The height of the rectangular shape of each projection preferably falls within the range of 1 μm to 100 μm. Note that the width of each projection 13 is geometrically determined by the height of the projection 13 and an inclination a (see FIG. 3) of an inclined surface 14. This inclination a will be described later.

The inclined surfaces 14 of the projections 13 are inclined at the same angle toward the center C of the light guide 12. The inclining directions of the inclined surfaces 14 switch at the center of the light guide 12 with which the total reflection areas A and A' are in contact. On the Y-axis passing through the center C, the inclined surfaces 14 of the right and left total reflection areas A and A' form a V-shaped groove.

The other inclined surface of each rectangular projection 13 is formed as a vertical surface 15 vertical to the light guide 12. In this case, an axis vertical to the light guide 12 is assumed to be a Z-axis. The projection 13 therefore has the shape of a right-angled triangle with the inclined surface 14 being the hypotenuse.

The light sources 16 such as LEDs or fluorescent tubes are arranged on right and left edges 12a and 12b of the light guide 12, respectively. When this reflection illumination device is to be used for a compact device such as a portable telephone, a light source that requires no inverter circuit, e.g., an LED, is preferably selected. If a point light source such as an LED is used as the light source 16, a plurality of light sources 16 are preferably arranged at equal intervals along the edges 12a and 12b, as shown FIG. 1. In this embodiment, three light sources are arranged along each edge.

In addition, the periphery of the light guide 12 is preferably surrounded by a reflecting member 19 to prevent illumination light from leaking outside from the periphery of the light guide 12. This reflecting member 19 is preferably formed from a mirror member having a high reflectance. Note that the reflecting member 19 may be formed from a metal plate made of a metal having a high reflectance, e.g., aluminum, a plastic plate having a metal such as aluminum deposited or bonded to its surface, or the like.

Portions of the reflecting member 19 which correspond to the edges 12a and 12b are formed as holding portions 19a and 19b for holding the light sources 16. Each of the holding portions 19a and 19b has a cross-section in the form of a quadratic curve. The light sources 16 are attached to the focal portions of the quadratic curve. Each holding portion is formed to have such a cross-section in the form of a quadratic curve so as to irradiate the interior of the light guide 12 with light from the light sources 16 as collimated illumination light.

The holding portions 19a and 19b are preferably mounted on the light guide 12 in a slightly inclined state, and openings are preferably formed in the holding portions 19a and 19b, respectively, to be as wide as possible in the direction of thickness of the light guide 12. Such a structure is taken to allow illumination light emerging from the opening of the holding portion 19a (19b) to be directly applied to almost all the projections 13 from the edge 12a (12b) of the light guide 12 to the center C.

The holding portions 19a and 19b having the above structure constitute an irradiation means for parallelly irradiating the entire total reflection areas A and A' with light from the light sources 16.

The above inclination α will be described next. The inclination of each inclined surface 14 can be determined as follows. As shown in FIG. 3, let α be the inclination of the inclined surface 14 with respect to the light guide 12, i.e., the X-axis, β be the mounting angle (equal to the irradiation direction angle of illumination light) of each of the holding portions 19a and 19b with respect to the X-axis, and θ be the incident angle of illumination light S from each light source 16 with respect to a line perpendicular to the inclined surface 14. In addition, the critical angle of the material for the light guide 12 is represented by $\theta_0$.

The following relationship holds between the angles α, β, and θ.

$$\alpha+\beta+\theta=90°$$

Since $\theta>\theta_0$ must be satisfied to allow the illumination light S to be totally reflected by the inside of the inclined surface 14, the inclination α of the inclined surface 14 must be $$\alpha<90°-(\beta+\theta_0)$$

If, for example, the light guide 12 is made of acrylic resin, since the critical angle of acrylic resin is known to be 42°, the inclination a may be selected to satisfy $\alpha<48°-\beta$.

Letting L (see FIG. 3) be the width of the total reflection areas A and A' in the lateral direction, and H (see FIG. 3) be the width of the openings in the holding portions 19a and 19b, the mounting angle β of the holding portions 19a and 19b is preferably determined to satisfy sin β=H/L. If the mounting angle β is selected in this manner, all the projections 13 in the total reflection areas A and A' can be directly irradiated with illumination light. If all the projections in the total reflection areas can be directly irradiated with light from the light sources, luminance irregularity in the total reflection areas can be eliminated.

The function of the reflection illumination device having the above arrangement will be described next.

Light from the light sources 16 is made into the collimated illumination light S by the holding portions 19a and 19b. The illumination light S is totally reflected by the inside of each inclined surface 14 at an angle equal to the incident angle θ, passes through the light guide 12 and liquid crystal display apparatus 10, and is reflected by a reflector plate 9. At this time, the collimated illumination light S emitted from the light sources 16 is directly applied to the projections 13 in the total reflection areas A and A'. The contents displayed on the liquid crystal display apparatus 10, which are obtained when the illumination light S is totally reflected by the inclined surfaces 14, are bright as a whole and high in quality having an almost uniform luminance distribution.

If the entire periphery of the light guide 12 is surrounded by the reflecting member 19 as in the reflection illumination device of this embodiment, since the illumination light S can be confined in the light guide 12, decreases in luminance at the peripheral portions at which the light sources 16 are not provided can be prevented, in particular, thereby obtaining display with uniform brightness as a whole.

In a normal operation state, external light R (see FIG. 3) strikes the light guide 12 from an almost vertical direction. The external light R is hardly reflected by the vertical surface 15. In addition, since the external light R is incident on the inclined surface 14 at an incident angle larger than the critical angle $\theta_0$, the external light is hardly reflected by the inclined surface 14 either.

Note that external light that reaches the light guide 12 upon undergoing diffused reflection at the surroundings of the reflection illumination device may partly strike the inclined surface 14 at an incident angle larger than the critical angle $\theta_0$. In this case, however, most of the external light totally reflected by the inclined surface 14 is diffused in the lateral direction of the light guide 12, and hence there is no chance of affecting the display quality.

A preferred embodiment of the present invention has been described above. However, the present invention is not limited to the above embodiment.

For example, in the above embodiment, the projections 13 each having a cross-section in the form of a right-angled triangle are formed on the surface of the light guide 12. Instead of the projections, however, recesses each having a cross-section in the form of a right-angled triangle may be formed in the surface of the light guide 12.

In addition, as a reference portion serving as a reference for the formation of the total reflection areas A and A', the center C of the light guide 12 is used in the above embodiment. However, a reference portion can be set at any arbitrary position as well as the center. In this case as well, the inclination α of the inclined surface 14 of each projection 13 and the mounting angle β of the holding portions 19a and 19b are preferably selected and determined to satisfy the above conditions.

If light sources with the same brightness are used in a case wherein the distances from the light sources to the projections or recesses in one total reflection area differ from those in the other total reflection area, illumination light brightness irregularity occurs between the total reflection areas, resulting in luminance irregularity of display. If, therefore, the central portion of the light guide is selected as a reference portion as in the above embodiment, the distances from the light sources to the projections or recesses in one total reflection. area can be made almost equal to those in the other total reflection area. This reduces the illumination light brightness irregularity between the total reflection areas, and hence makes it possible to obtain display with higher quality.

In the above embodiment, the total reflection areas A and A' are formed on the two sides of the center C, and the projections 13 are formed from the center C toward the edges 12a and 12b. If, however, the light guide 12 is rectangular, four total reflection areas may be formed around the center C, and projections may be formed in the respective total reflection areas from the center C to the respective edges. With this structure as well, since each total reflection area is irradiated with illumination light from corresponding light sources and irradiation means, each total reflection area can reflect illumination light with high luminance toward the object, thereby obtaining high-quality display that is bright and free from luminance irregularity. In this case, light sources and holding portions similar to those described above may be arranged at the respective edges. In addition, the inclination α of the inclined surface of each projection and the mounting angle β of each holding portion can be determined in the same manner as described above.

Figure 4:
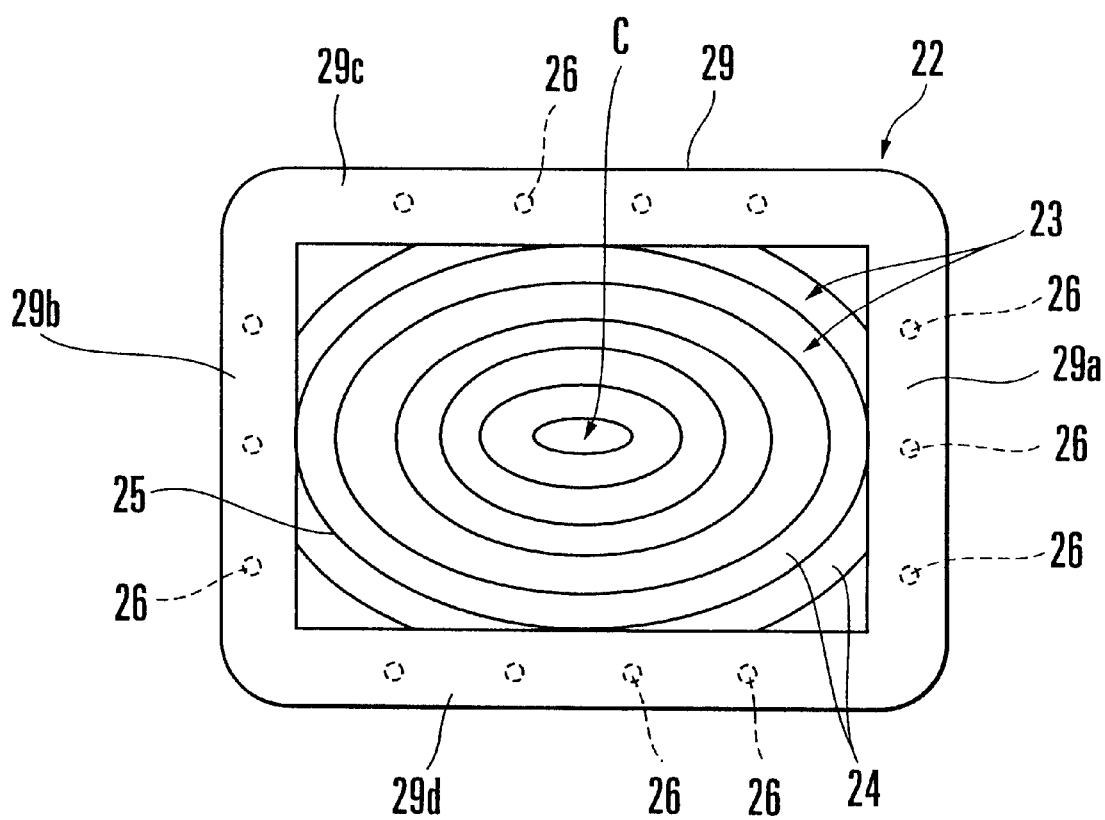
FIG. 4 is a plan view of a reflection illumination device according to another embodiment of the present invention.
Figure 5:
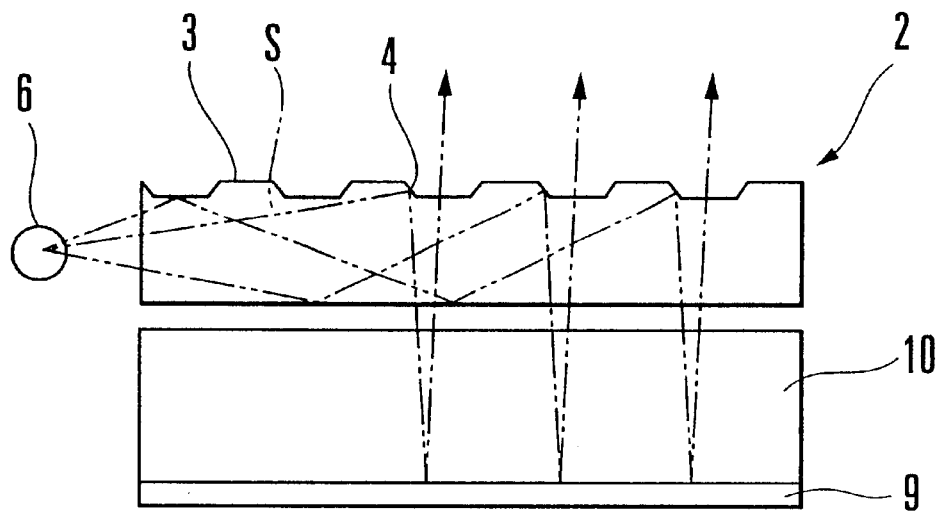
FIG. 5 is a sectional view showing an example of a liquid crystal display apparatus using a conventional reflection illumination device.
Figure 6:
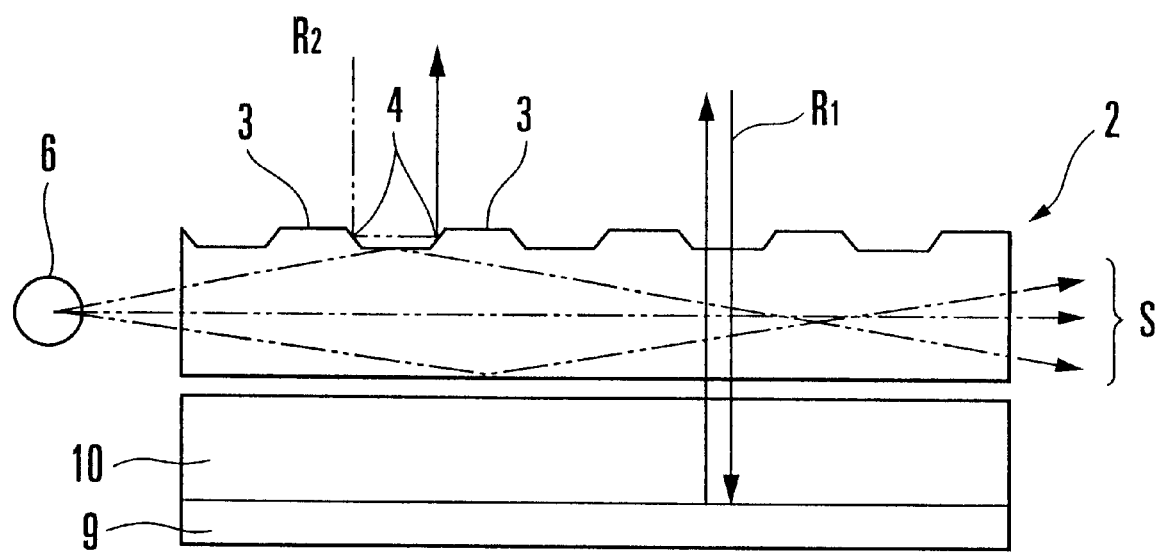
FIG. 6 is a sectional view for explaining problems in the conventional reflection illumination device.

The shape of each projection is not limited to the linear one that is parallel to an axis passing through the center C. Any shape, e.g., a circular shape, elliptic shape, or curved shape, can be selected. FIG. 4 shows the arrangement of a reflection illumination device according to another embodiment of the present invention, in which each projection has an elliptic shape. As shown in FIG. 4, in this reflection illumination device, a center C of a light guide 22 is set as the common center of curvature, and a plurality of elliptic projections 23 are formed. With this structure as well, since the entire total reflection areas are irradiated with light from a plurality of light sources and irradiation means, high-quality display that is bright and free from luminance irregularity can be obtained. In addition, even if a light guide having an arbitrary shape, e.g., a circular or elliptic shape, is used, this reflection illumination device can be formed. Each of the above projections 23 is formed to have a cross-section in the form of a right-angle triangle in the same manner as described above. All inclined surfaces 24 of the projections 23 are directed to the center C. Although not shown, a reflecting member 29 is mounted on the periphery of the light guide 22, and a plurality of light sources 26 arranged along the periphery of the light guide 22 are held by holding portions 29a to 29d of the reflecting member 29. As in the above embodiment, the holding portions 29a to 29d convert light from the light sources 26 into collimated illumination light to irradiate the projections 23 with the light.

A mounting angle β (see FIG. 3) of each of the holding portions 29a to 29d and the positions and number of light sources 26 to be arranged are preferably selected to directly irradiate the entire surface of the light guide 22, on which the projections 23 are formed, with illumination light.

An inclination a of each inclined surface 24 (see FIG. 3) is determined by a critical angle $\theta_0$ of the material for the light guide 22, and the mounting angle β of each of the holding portions 29a to 29d as in the above embodiment.

As has been described above, in a reflection illumination device according to the present invention which includes a light guide placed in front of an object to be illuminated, a light source arranged around the light guide, and a reflecting mirror placed behind the object, one or a plurality of total reflection areas on which projections or recesses each having a triangular cross-section and serving to totally reflect light emitted from the light source toward the object are formed are arranged on a surface of the light guide, each of the projections or recesses is constituted by an inclined surface inclined at a predetermined angle toward a reference portion positioned at a predetermined position on the light guide, and a vertical surface vertical to the light guide, and the light source and irradiation means for parallelly irradiating the total reflection area with light from the light sources are arranged at an edge of the light guide in correspondence with the total reflection area.

According to the present invention, light emitted from the light sources is totally reflected by the inclined surface of each projection or recess, passes through the light guide and object, and is reflected by the reflecting mirror. Since the total reflection areas are formed on the light guide, together with the light sources and irradiation means in correspondence with the total reflection areas, each total reflection area is irradiated with collimated illumination light from corresponding light sources. Almost whole external light incident on the surface of the light guide enters the light guide without being reflected by the projections or recesses each formed on the surface of the light guide to have a triangular cross-section. Therefore, there is no possibility that the external light is reflected by the surface of the light guide and degrades the display quality of the object.

In addition, since this device is designed to directly irradiate each projection or recess in the total reflection areas and display the object with the resultant reflected light, high-quality display that is bright and free from luminance irregularity can be obtained.

Furthermore, the device having the reflecting member around the periphery of the light guide can provide high-quality display without luminance irregularity by preventing decreases in luminance at the peripheral portions of the light guide.

What is claimed is:

1. A reflection illumination device comprising a light guide placed in front of an object to be illuminated, a light source arranged around said light guide, and a reflecting mirror placed behind the object, wherein one or a plurality of total reflection areas on which adjacent projections or recesses each having a triangular cross-section and serving to totally reflect light emitted from said light source toward the object are formed and are arranged on a surface of said light guide, each of the projections or recesses is constituted by an inclined surface inclined at a predetermined angle smaller than $90°-(\beta+\theta_0)$ where $\beta$ is the irradiation direction of illumination light from the light source and $\theta_0$ is a critical angle of a material for said light guide, toward a reference portion positioned at a predetermined position on said light guide, and a vertical surface vertical to said light guide, and said light source and irradiation means surrounding the light source except for the area illuminating the light guide for parallelly irradiating the total reflection area with light from said light source are arranged at an edge of said light guide in correspondence with the total reflection area.

2. A device according to claim 1, wherein the total reflection area comprises a plurality of total reflection areas arranged on two sides or around the reference portion.

3. A device according to claim 1, wherein the projection or recess is formed to have a circular shape, an elliptic shape, or a closed curved shape, and said light source and said irradiation means are arranged at predetermined portions of the edge of said light guide.

4. A device according to claim 1, wherein the reference portion is positioned to the center of said light guide.

5. A device according to claim 1, wherein said irradiation means inclines an irradiation direction of illumination light at a predetermined angle with respect to said light guide to directly irradiate all the projections or recesses in the total reflection area with collimated light.

6. A device according to claim 1, further comprising a reflecting member surrounding a peripheral portion of said light guide.

* * * * *